United States Patent
Ikeda

(10) Patent No.: US 9,053,872 B2
(45) Date of Patent: Jun. 9, 2015

(54) ELECTRIC STORAGE APPARATUS AND MANUFACTURING METHOD OF ELECTRIC STORAGE APPARATUS

(75) Inventor: Hiroaki Ikeda, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/521,479

(22) PCT Filed: Aug. 23, 2011

(86) PCT No.: PCT/JP2011/004669
§ 371 (c)(1),
(2), (4) Date: Jul. 11, 2012

(87) PCT Pub. No.: WO2013/027238
PCT Pub. Date: Feb. 28, 2013

(65) Prior Publication Data
US 2014/0170502 A1    Jun. 19, 2014

(51) Int. Cl.
*H01G 11/84* (2013.01)
*H01G 11/26* (2013.01)
*H01G 11/28* (2013.01)
*H01G 11/30* (2013.01)
*H01M 4/04* (2006.01)
*H01M 10/04* (2006.01)
*H01M 10/052* (2010.01)
*H01M 10/0585* (2010.01)
*H01G 11/08* (2013.01)
*H01G 13/00* (2013.01)
*H01M 4/02* (2006.01)

(52) U.S. Cl.
CPC .............. *H01G 11/84* (2013.01); *Y10T 29/147* (2015.01); *Y02E 60/13* (2013.01); *H01G 11/26* (2013.01); *H01G 11/28* (2013.01); *H01G 11/30* (2013.01); *H01M 4/0404* (2013.01); *H01M 10/0413* (2013.01); *H01M 10/052* (2013.01); *H01M 10/0585* (2013.01); *Y02E 60/122* (2013.01); *H01G 11/08* (2013.01); *H01G 13/00* (2013.01); *H01M 4/02* (2013.01); *H01M 4/04* (2013.01)

(58) Field of Classification Search
CPC ....... H01M 4/0404; H01M 4/02; H01M 4/04; H01M 10/0413; H01M 10/052; H01M 10/0585; H01M 10/0525; H01M 10/0587; Y02E 60/122; Y02E 60/13; H01G 11/26; H01G 11/28; H01G 11/30; H01G 11/84; H01G 13/00
See application file for complete search history.

(56) References Cited

FOREIGN PATENT DOCUMENTS

| JP | 10-241735 | | 9/1998 | |
|---|---|---|---|---|
| JP | 10-241735 | * | 11/1998 | ............ H01M 10/40 |

(Continued)

*Primary Examiner* — Raymond Alejandro
(74) *Attorney, Agent, or Firm* — Finnegan, Henderson, Farabow, Garrett & Dunner, LLP

(57) ABSTRACT

An electric storage apparatus has a positive electrode plate, a negative electrode plate, and a separator. Each of the positive electrode plate and the negative electrode plate has a collector plate and an active material layer containing an electrolytic solution, and the active material layer is formed in a predetermined width on a partial region of a collector plate. The separator is placed between the positive electrode plate and the negative electrode plate and contains an electrolytic solution. At least one of the positive electrode plate and the negative electrode plate, an edge of the active material layer in a width direction has a waveform. A set value Wn of the width of the active material layer and a variation $\Delta W$ of the width of the active material layer satisfy a condition of $0.03 \le \Delta/Wn \le 0.056$.

4 Claims, 3 Drawing Sheets

(56) References Cited

FOREIGN PATENT DOCUMENTS

| JP | 11-162516 | 6/1999 |
| JP | 2005-190913 | 7/2005 |
| JP | 2006-79942 | 3/2006 |
| JP | 2006-172808 | 6/2006 |
| JP | 2007-329077 | 12/2007 |

* cited by examiner

ELECTRIC STORAGE APPARATUS AND MANUFACTURING METHOD OF ELECTRIC STORAGE APPARATUS

CROSS-REFERENCE TO RELATED APPLICATIONS

This application is a national phase application of International Application No. PCT/JP2011/004669, filed Aug. 23, 2011, the content of which is incorporated herein by reference.

TECHNICAL FIELD

The present invention relates to an electric storage apparatus having electrodes each including an active material layer formed on a surface of a collector plate, and to a manufacturing method of the electric storage apparatus.

BACKGROUND ART

A secondary battery has a positive electrode plate, a negative electrode plate, and a separator placed between the positive electrode plate and the negative electrode plate. The positive electrode plate has a collector plate and a positive electrode active material layer formed on a surface of the collector plate. The negative electrode plate has a collector plate and a negative electrode active material layer formed on a surface of the collector plate.

In forming the positive electrode plate or the negative electrode plate, the collector plate is formed as a long length of sheet, and the constituent material of the active material layer is applied onto the collector plate along its longitudinal direction. The width of the active material layer is smaller than the width of the collector plate, and a partial region of the collector plate is not covered with the active material layer. The collector plate having the active material layer formed thereon can be cut into predetermined lengths to provide positive electrode plates or negative electrode plates.

PRIOR ART DOCUMENT

Patent Document

[Patent Document 1] Japanese Patent Laid-Open No. 11 (1999)-162516

SUMMARY OF THE INVENTION

Problems to be Solved by the Invention

In the application of the constituent material of the active material layer onto the collector plate, the width of the active material layer may vary. The variations in the width of the active material layer may cause variations in the capacities of the manufactured secondary batteries or may influence the capacities of the secondary batteries.

Means for Solving the Problems

An electric storage apparatus according to a first aspect of the present invention has a positive electrode plate, a negative electrode plate, and a separator. Each of the positive electrode plate and the negative electrode plate has a collector plate and an active material layer containing an electrolytic solution, and the active material layer is formed in a predetermined width on a partial region of a collector plate. The separator is placed between the positive electrode plate and the negative electrode plate and contains an electrolytic solution. At least one of the positive electrode plate and the negative electrode plate, an edge of the active material layer in a width direction has a waveform. A set value Wn of the width of the active material layer and a variation ΔW of the width of the active material layer satisfy a condition of the following expression (I):

$$0.03 \leq \Delta W/Wn \leq 0.056 \qquad (I)$$

According to the first aspect of the present invention, the ratio (ΔW/Wn) is set to be equal to or lower than 0.056 in the state in which the waveform is produced on the edge of the active material layer, thereby enabling suppression of a reduction in the capacity of the electric storage apparatus. In addition, the ratio (ΔW/Wn) can be set to be equal to or higher than 0.03 to suppress a deviation of the capacity of the electric storage apparatus from the capacities of the other electric storage apparatuses.

The width of the active material layer of the negative electrode plate can be larger than the width of the active material layer of the positive electrode plate. In this case, the active material layer of the negative electrode plate can be set to satisfy the condition of the expression (I). The region of the active material layer of the negative electrode plate that is opposed to the active material layer of the positive electrode plate corresponds to the region in which a chemical reaction is performed in charge and discharge of the electric storage apparatus. Thus, the region in which the chemical reaction is performed is located not to be adjacent to the edge of the active material layer, which can prevent the edge of the active material layer from adversely affecting the charge and discharge of the electric storage apparatus.

The edge can be formed at a position in the collector plate that is adjacent to the region in which the active material layer is not formed. In this edge, the waveform satisfying the expression (I) can be formed easily.

A method of manufacturing an electric storage apparatus according to a second aspect of the present invention has the three steps. At a first step, an active material layer is formed in a predetermined width on a partial region of a collector plate to manufacture a positive electrode plate and a negative electrode plate. At a second step, a separator is placed between the positive electrode plate and the negative electrode plate. At a third step, the active material layer in each of the positive electrode plate and the negative electrode plate and the separator are impregnated with an electrolytic solution.

At the first step, in manufacturing at least one of the positive electrode plate and the negative electrode plate, a waveform is formed on an edge of the active material layer in a width direction. A set value Wn of the width of the active material layer and a variation ΔW of the width of the active material layer are set to satisfy a condition of the following expression (II):

$$0.03 \leq \Delta W/Wn \leq 0.056 \qquad (II)$$

According to the second aspect of the present invention, the ratio (ΔW/Wn) is set to be equal to or lower than 0.056 in the state in which the waveform is produced on the edge of the active material layer, thereby enabling suppression of a reduction in the capacity of the electric storage apparatus. In addition, the ratio (ΔW/Wn) can be set to be equal to or higher than 0.03 to suppress variations in capacity among a plurality of electric storage apparatuses.

A constituent material of the active material layer can be applied onto a surface of the collector plate by a die coater. The die coater releases the constituent material of the active material layer to the collector plate. The variation ΔW can be adjusted by changing the distance between the die coater and the collector plate. Thus, the ratio (ΔW/Wn) can be easily adjusted so as to satisfy the condition of the expression (II).

MODE FOR CARRYING OUT THE INVENTION

An embodiment of the present invention will hereinafter be described.

Embodiment 1

Figure 1:
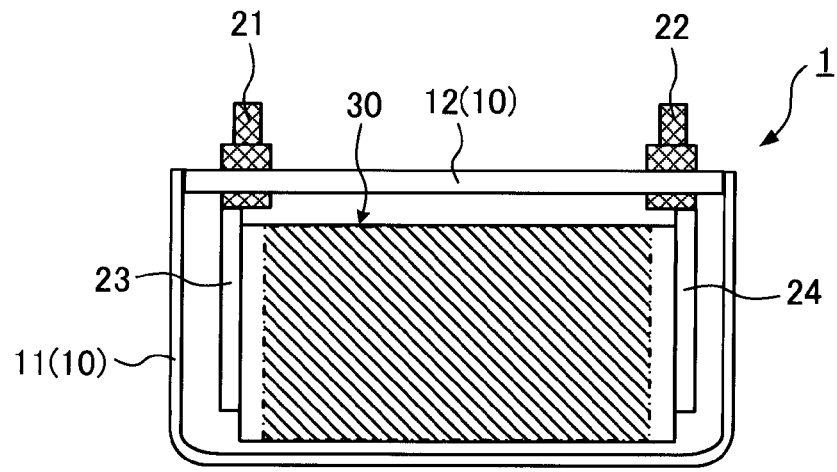
FIG. 1 is a schematic diagram showing the internal structure of a cell.

A cell (corresponding to an electric storage apparatus) which is Embodiment 1 of the present invention is described with reference to FIG. 1. FIG. 1 is a schematic diagram showing the internal structure of the cell. A secondary battery such as a nickel metal hydride battery and a lithium-ion battery can be used as the cell 1. Instead of the secondary battery, an electric double layer capacitor can be used.

The cell 1 can be mounted on a vehicle, for example. Specifically, a plurality of cells 11 can be used to constitute an assembled battery which can be mounted on the vehicle. The plurality of cells 1 can be connected electrically in series or connected electrically in parallel.

The assembled battery can be used as a power source for running of the vehicle. When an electric energy output from the assembled battery is converted into a kinetic energy by a motor generator, the kinetic energy can be used to run the vehicle. For decelerating or stopping the vehicle, the motor generator can convert a kinetic energy produced in braking of the vehicle into an electric energy. The electric energy generated by the motor generator can be stored as regenerative power in the assembled battery.

The cell 1 has a cell case 10 and a power-generating element 30 housed in the cell case 10. The cell case 10 can be made of metal, for example, and has a case body 11 and a lid 12. The case body 11 has an opening portion for inserting the power-generating element 30, and the lid 12 closes the opening portion of the case body 11. The lid 12 is fixed to the case body 11 to seal the cell case 10 hermetically. The case body 11 and the lid 12 can be fixed to each other, for example by welding.

A positive electrode terminal 21 and a negative electrode terminal 22 are fixed to the lid 12 and protrude toward the outside of the cell case 10. A positive electrode tab 23 is connected to the positive electrode terminal 21 and the power-generating element 30 to connect the positive electrode terminal 21 electrically to the power-generating element 30. The positive electrode tab 23 can be provided as a component separate from the positive electrode terminal 21 or provided integrally with the positive electrode terminal 21. A negative electrode tab 24 is connected to the negative electrode terminal 22 and the power-generating element 30 to connect the negative electrode terminal 22 electrically to the power-generating element 30. The negative electrode tab 24 can be provided as a component separate from the negative electrode terminal 22 or provided integrally with the negative electrode terminal 22.

Figure 2:
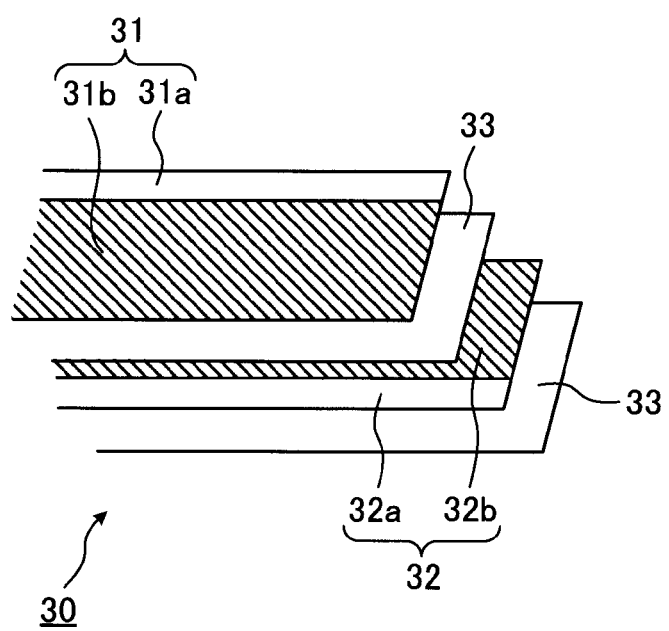
FIG. 2 is a developed view of a power-generating element.

FIG. 2 is a developed view of the power-generating element 30. FIG. 2 shows part of the power-generating element 30.

The power-generating element 30 is an element for performing charge and discharge and has a positive electrode plate 31, a negative electrode plate 32, and a separator 33. The positive electrode plate 31 has a collector plate 31a and a positive electrode active material layer 31b formed on a surface of the collector plate 31a. The positive electrode active material layer 31b contains a positive electrode active material, a conductive material, a binder and the like. When the lithium-ion secondary battery is used as the cell 1, examples of the positive electrode active material can include $LiCoO_2$, $LiMn_2O_4$, $LiNiO_2$, $LiFePO_4$, $Li_2FePO_4F$, $LiCo_{1/3}Ni_{1/3}Mn_{1/3}O_2$, and $Li(Li_aNi_xMn_yCO_z)O_2$. Examples of the material of the collector plate 31a can include aluminum.

The positive electrode active material layer 31b covers a partial region of the collector plate 31a. In other words, one end portion of the collector plate 31a is not covered with the positive electrode active material layer 31b and is exposed to the outside. The positive electrode active material layer 31b can be formed on the surface of the collector plate 31a by using an application apparatus such as a die coater and a gravure coater.

The negative electrode plate 32 has a collector plate 32a and a negative electrode active material layer 32b formed on a surface of the collector plate 32a. The negative electrode active material layer 32b contains a negative electrode active material, a conductive material, a binder and the like. When the lithium-ion secondary battery is used as the cell 1, examples of the negative electrode active material can include amorphous graphite. Examples of the material of the collector plate 32a can include copper.

The negative electrode active material layer 32b covers a partial region of the collector plate 32a. In other words, one end portion of the collector plate 32a is not covered with the negative electrode active material layer 32b and is exposed to the outside. The negative electrode active material layer 32b can be formed on the surface of the collector plate 32a by using an application apparatus such as a die coater and a gravure coater. The positive electrode active material layer 31b, the negative electrode active material layer 32b, and the separator 33 are impregnated with an electrolytic solution. When the lithium-ion secondary battery is used as the cell 1, examples of the electrolytic solution can include a mixture of $LiPF_6$ and a solvent containing mixed EC (Ethylene Carbonate), DMC (Dimethyl Carbonate), and EMC (Ethyl Methyl Carbonate).

The positive electrode plate 31, the negative electrode plate 32, and the separator 33 are stacked in the order shown in FIG. 2, and the stack is wound to provide the power-generating element 30. The region of the collector plate 31a that is not covered with the positive electrode active material layer 31b is connected to the positive electrode tab 23 (see FIG. 1). This electrically connects the positive electrode plate 31 of the power-generating element 30 to the positive electrode terminal 21. The region of the collector plate 32a that is not covered with the negative electrode active material layer 32b is connected to the negative electrode tab 24 (see FIG. 1). This electrically connects the negative electrode plate 32 of the power-generating element 30 to the negative electrode terminal 22.

The cell 1 of the present embodiment is of a so-called square type in which the power-generating element 30 is housed in the cell case 10 formed to conform to a rectangle. In addition to the cell of the square type, a so-called cylindrical type of cell can be used as the cell 1. In the cylindrical type of cell, the power-generating element is housed in a cell case having a cylindrical shape. The configuration of the power-generating element in the cylindrical type of cell is the same as that shown in FIG. 2.

Figure 3:
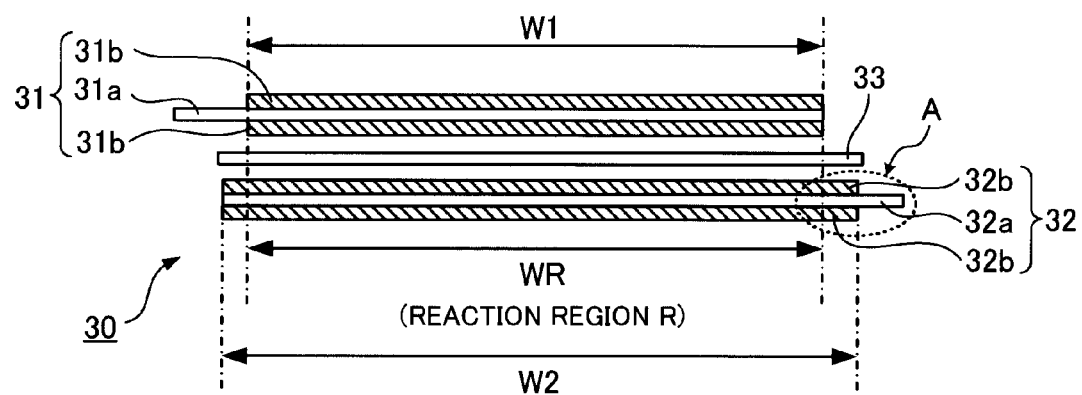
FIG. 3 is a section view of a positive electrode, a negative electrode, and a separator.

FIG. 3 is a section view of the positive electrode plate 31, the negative electrode plate 32, and the separator 33. Specifically, FIG. 3 is a diagram when the positive electrode plate 31, the negative electrode plate 32, and the separator 33 are cut in a plane orthogonal to the longitudinal direction (left-right direction of FIG. 2) of the positive electrode plate 31, the negative electrode plate 32, and the separator 33.

As shown in FIG. 3, the positive electrode active material layer 31b is formed on each of the surfaces of the collector plate 31a, and the negative electrode active material layer 32b is formed on each of the surfaces of the collector plate 32a. The separator 33 is placed between the positive electrode active material layer 31b and the negative electrode active material layer 32b and is in contact with the positive electrode active material layer 31b and the negative electrode active material layer 32b.

While the positive electrode active material layer 31b is formed on each of the surfaces of the collector plate 31a and the negative electrode active material layer 32b is formed on each of the surfaces of the collector plate 32a in the present embodiment, the present invention is not limited thereto. Specifically, it is possible to use an electrode (so-called bipolar electrode) in which the positive electrode active material layer 31b is formed on one surface of a collector plate and the negative electrode active material layer 32b is formed on the other surface of the collector plate.

The power-generating element 30 can be provided by stacking a plurality of bipolar electrodes. The separator 33 is placed between two bipolar electrodes adjacent to each other in the stacking direction. The positive electrode tab and the negative electrode tab are placed on both ends of the power-generating element 30 in the stacking direction. Part of the positive electrode tab and part of the negative electrode tab protrude to the outside of the cell case. A laminate film can be used, for example, as the cell case.

The region in which the positive electrode active material layer 31b is opposed to the negative electrode active material layer 32b with the separator 33 interposed between them corresponds to the region in which a chemical reaction is performed during charge and discharge of the cell 1 (hereinafter referred to as a reaction region R). When the lithium-ion secondary battery is used as the cell 1, lithium ions move in the reaction region R based on charge or discharge.

Since a width W2 of the negative electrode active material layer 32b is larger than a width W1 of the positive electrode active material layer 31b in the present embodiment, a width WR of the reaction region R is equal to the width W1 of the positive electrode active material layer 31b. Alternatively, the width W1 of the positive electrode active material layer 31b may be larger than the width W2 of the negative electrode active material layer 32b. In this case, the width WR of the reaction region R is equal to the width W2 of the negative electrode active material layer 32b.

Figure 4:
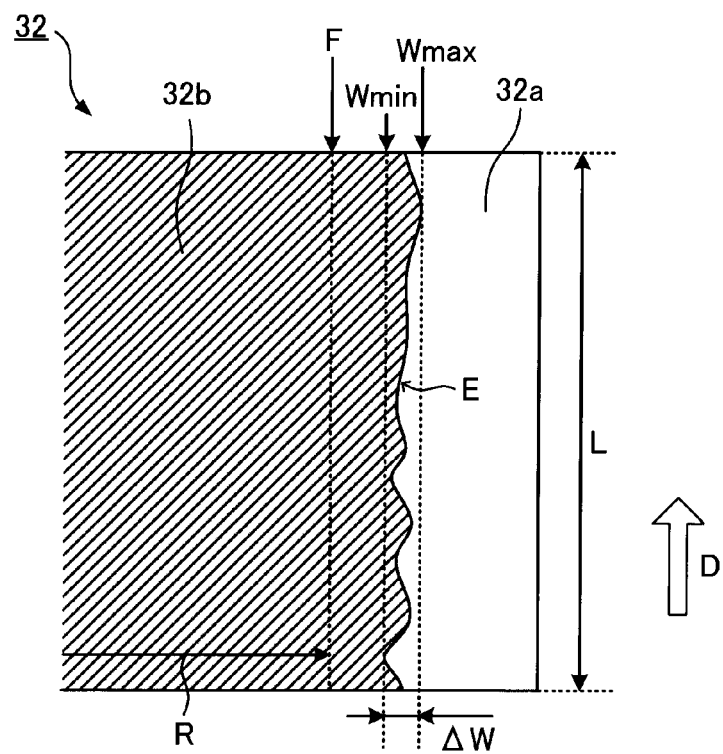
FIG. 4 is an enlarged view showing an edge of a negative electrode active material layer.

FIG. 4 is a front view of part of the negative electrode plate 32 and is an enlarged view of a region A shown in FIG. 3.

The negative electrode active material layer 32b is formed by applying the constituent material (including the negative electrode active material) of the negative electrode active material layer 32b onto the surfaces of the collector plate 32a. The constituent material of the negative electrode active material layer 32b is applied onto the collector plate 32a along a direction indicated by an arrow D in FIG. 4. The collector plate 32a extends in the direction indicated by the arrow D, and FIG. 4 shows part of the negative electrode plate 32 (collector plate 32a). When the constituent material of the negative electrode active material layer 32b is applied onto the collector plate 32a, a waveform may be produced on an edge E of the negative electrode active material layer 32b. The waveform on the edge E results from variations in the width of the applied constituent material of the negative electrode active material layer 32b. The edge E is one end of the negative electrode active material layer 32b in the width direction and is located adjacently to the region of the collector plate 32a that is to be connected to the negative electrode tab 24.

Wmax shown in FIG. 4 indicates the position of the edge E where the negative electrode active material layer 32b has the largest width in the range of a length L. Wmin indicates the position of the edge E where the negative electrode active material layer 32b has the smallest width in the range of the length L.

A difference ΔW between the largest width Wmax and the smallest width Wmin corresponds to a (maximum) variation of the width W2 of the negative electrode active material layer 32b. The widths Wmax and Wmin, and the variation ΔW are determined in the range of the length L of the negative electrode plate 32. The length L can be set as appropriate. For example, the length L can be set to be larger than the width W2 of the negative electrode active material layer 32b. If the variation ΔW is present in the range of the length L, the waveform is produced on the edge E of the negative electrode active material layer 32b. When the length L is extremely small, it is difficult to determine whether or not the waveform is produced on the edge E.

In the present embodiment, the variation ΔW is set as described later in the state in which the waveform is produced on the edge E of the negative electrode active material layer 32b, thereby enabling suppression of variations in capacity among a plurality of cells 1 or suppression of a reduction in the capacity of the cell 1. The length L is only required to be set to a length in which the presence of the waveform on the edge E can be identified.

As shown in FIG. 4, an edge F of the reaction region R is located on the inner side than the edge E of the negative electrode active material layer 32b. The edge F corresponds to one end of the reaction region R in the width direction of the negative electrode active material layer 32b.

In the present embodiment, as shown in FIG. 3 and FIG. 4, the waveform is produced only on the edge E located at the one end in the width direction of the negative electrode active material layer 32b. The edge located at the other end in the width direction of the negative electrode active material layer 32b is formed along the edge (in straight line) of the collector plate 32a. Alternatively, the waveform may be produced on the edges located at both ends in the width direction of the negative electrode active material layer 32b.

Figure 5:
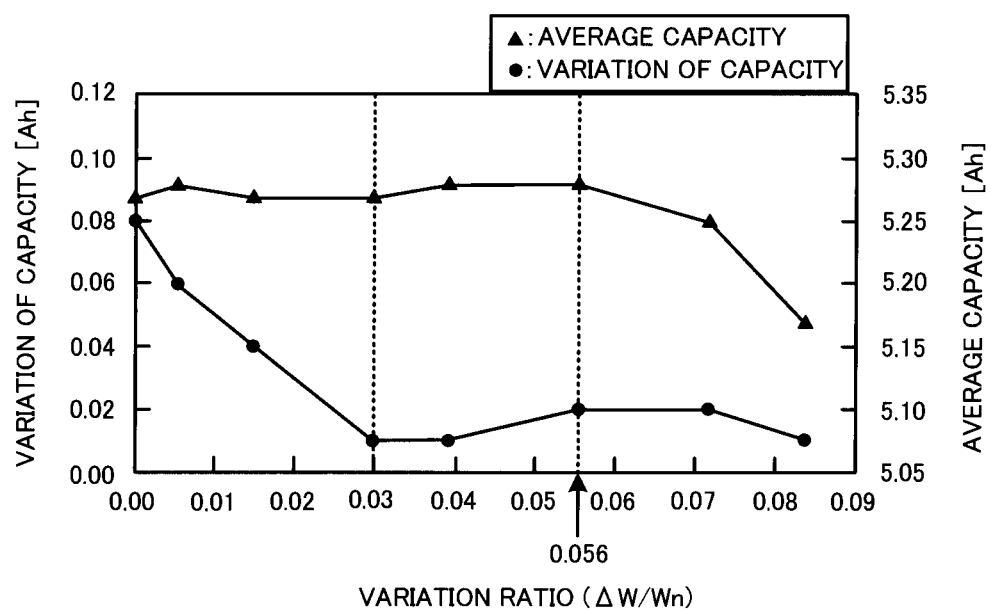
FIG. 5 is a graph showing the relationship among a variation of the width of the negative electrode active material layer, a variation of capacity in cells, and a capacity in cells.

FIG. 5 shows experiment results when the variation ΔW of the width W2 is changed. The vertical axis in FIG. 5 represents a variation of capacity and an average capacity. The variation of capacity refers to a (maximum) variation of capacity among the plurality of cells 1. The variation of capacity can be measured with a method described below.

First, the plurality of cells 1 having the variation ΔW at a specific value are manufactured, and the capacities of those cells 1 are measured. Each of the cells 1 is fully charged and then is discharged at a predetermined rate, so that the capacities of the cells 1 can be measured. Next, the cell 1 having the largest capacity and the cell 1 having the smallest capacity are specified, and the difference between the (maximum) capacity and the (minimum) capacity is calculated to obtain the variation of capacity. When the value of the variation ΔW is changed, the variation of capacity can be obtained in association with each value of the variation ΔW.

The average capacity refers to an average value of the capacities of the plurality of cells 1. The average capacity can be measured with a method described below.

First, the plurality of cells 1 having the variation ΔW at a specified value are manufactured, and the capacities of those cells 1 are measured. The measurement of the capacities of the cells 1 is performed in the same manner as that described above. After the measurement of the capacity of each of the cells 1, the average value of the capacities of the plurality of cells 1 is calculated to obtain the average capacity. When the value of the variation ΔW is changed, the average capacity can be obtained in association with each value of the variation ΔW.

The horizontal axis in FIG. 5 represents a ratio (ΔW/Wn) between the variation ΔW and the width Wn of the negative electrode active material layer 32b. The variation ΔW is defined as the variation of the width W2 of the negative electrode active material layer 32b in the range of the length L of 30 cm. While the length L is set to 30 cm in the experiment results shown in FIG. 5, the present invention is not limited thereto. The length L may be larger than 30 cm or may be smaller than 30 cm. The length L is preferably equal to or larger than 10 cm.

The width Wn refers to a width (set value) in which the constituent material of the negative electrode active material layer 32b is applied. In the experiment shown in FIG. 5, the constituent material of the negative electrode active material layer 32b is applied onto the collector plate 32a by using the die coater.

In the die coater, the constituent material of the negative electrode active material layer 32b is released from an ejection port of a die toward the collector plate 32a. When a distance (referred to as a die gap) between the ejection port of the die and the collector plate 32a is changed, the width Wn of the negative electrode active material layer 32b can be changed. When the die gap is widened, the width Wn of the negative electrode active material layer 32b can be increased. When the die gap is narrowed, the width Wn of the negative electrode active material layer 32b can be reduced.

On the other hand, when the die gap is widened in the range in which the width Wn is obtained, the variation ΔW is easily increased. When the die gap is narrowed in the range in which the width Wn is obtained, the variation ΔW is easily reduced. In the experiment shown in FIG. 5, the die gap is changed to change the variation ΔW and to change the variation ratio (ΔW/Wn).

As shown in FIG. 5, when the variation ratio (ΔW/Wn) is lower than 0.03, the variation of capacity is increased. When the variation ratio (ΔW/Wn) is equal to or higher than 0.03, the variation of capacity does not tend to increase. As the variation ratio (ΔW/Wn) is lower, the edge E of the negative electrode active material layer 32b is closer to a straight line.

The edge E of the negative electrode active material layer 32b is formed in the waveform rather than a straight line to allow the negative electrode active material layer 32b to be easily impregnated with the electrolytic solution. When the negative electrode active material layer 32b is easily impregnated with the electrolytic solution, variations in capacity among the plurality of cells 1 can be suppressed.

For manufacturing the cell 1, the positive electrode plate 31, the negative electrode plate 32, and the separator 33 are stacked and then the stack is impregnated with the electrolytic solution. The easy impregnation of the negative electrode active material layer 32b with the electrolytic solution can suppress variations in the amount of the impregnation of the electrolytic solution into the negative electrode active material layer 32b. Since the amount of the electrolytic solution impregnated into the negative electrode active material layer 32b influences the capacity of the cell 1, the suppression of variations in the amount of the impregnation of the electrolytic solution can avoid variations in capacity among the plurality of cells 1.

As described above, the cell 1 of the present embodiment can be used as the assembled battery mounted on the vehicle. In the assembled battery having the plurality of cells 1, variations in capacity among the plurality of calls 1 may adversely affect charge and discharge control of the assembled battery. For example, the charge and discharge of the assembled battery may be controlled by setting the cell 1 having the smallest capacity as the reference. In this case, the cells 1 having capacities larger than that of the reference cell 1 each have a portion which does not contribute to the charge and discharge of the assembled battery, so that all of the cells 1 can not be efficiently charged or discharged. When variations in capacity among the plurality of cells 1 are suppressed as in the present embodiment, all of the cells 1 constituting the assembled battery can be efficiently charged and discharged.

On the other hand, as shown in FIG. 5, when the variation ratio (ΔW/Wn) is higher than 0.056, the average capacity is reduced. When the variation ratio (ΔW/Wn) is equal to or lower than 0.056, the average capacity does not tend to reduce, and the average capacity can be maintained at a predetermined value or larger.

When the variation ratio (ΔW/Wn) is higher than 0.056, the edge E of the negative electrode active material layer 32b has larger projections and depressions. When the edge E has the larger projections and depressions, and lithium ions move to the region along the edge E of the negative electrode active material layer 32b, especially to the region of the negative electrode active material layer 32b with a larger width, then the lithium ions do not return to the reaction region R easily. In the cell 1, charge and discharge are performed by the lithium ions moving in the reaction region R.

When the lithium ions move to the region out of the reaction region R, the lithium ions can not contribute to the charge and discharge, and the capacity of the cell 1 is reduced. Especially, when the projections and depressions of the edge E are extremely large, the lithium ions moving to the region along the edge E are difficult to return to the reaction region R. Thus, the variation ratio (ΔW/Wn) is set to be 0.056 or lower to allow even the lithium ions moving to the region along the edge E to be returned easily to the reaction region R. This can suppress the reduction in the capacity of the cell 1.

As described above, the variation ratio (ΔW/Wn) is preferably set between 0.03 and 0.056. More preferably, the variation ratio (ΔW/Wn) can be set between 0.03 and 0.04. This can suppress the variations in capacity among the plurality of cells 1 or suppress the reduction in the capacity of the cell 1.

When the constituent material of the negative electrode active material layer 32b is applied onto the collector plate 32a by using the die coater, the die gap is first set to a predetermined value. The setting of the die gap to the predetermined value can set the width Wn of the negative electrode active material layer 32b. After the constituent material of the negative electrode active material layer 32b is applied onto the collector plate 32a, the variation ΔW is measured in the range of the length L. The variation ratio (ΔW/Wn) is calculated from the width Wn as the set value (fixed value) and the variation ΔW, and it is determined whether or not the variation ratio (ΔW/Wn) satisfies the condition of the following expression (1).

$$0.03 \leq \Delta W/Wn \leq 0.056 \qquad (1)$$

When the variation ratio (ΔW/Wn) does not satisfy the condition of the expression (1), the die gap is adjusted. Since widening the die gap easily increases the variation ratio, the die gap can be widened when the variation ratio (ΔW/Wn) is lower than 0.03. On the other hand, when the variation ratio (ΔW/Wn) is larger than 0.056, the die gap can be narrowed.

In this manner, the variation ΔW can be adjusted in the process of manufacturing the negative electrode plate 32 such that the variation ratio (ΔW/Wn) satisfies the condition of the expression (1).

While the die coater is used in the experiment shown in FIG. 5, the present invention is not limited thereto, and any device may be used as long as the variation ΔW can be adjusted. For example, the gravure coater can be used instead of the die coater. In the gravure coater, the constituent material of the negative electrode active material layer 32b is held in a (engraved) groove formed in a surface of a gravure roll. Then, the collector plate 32a is brought into contact with the surface of the gravure roll, so that the constituent material of the negative electrode active material layer 32b can be applied onto the surface of the collector plate 32a.

When the gravure coater is used, an experiment can be previously performed to cause the variation ratio (ΔW/Wn) to satisfy the condition of the above expression (1). For example, it is possible to set the rotation speed of the gravure roll or the shape of the groove formed in the surface of the gravure roll as appropriate such that the variation ratio (ΔW/Wn) satisfies the condition of the above expression (1).

While attention is focused on the variation ratio (ΔW/Wn) of the negative electrode plate 32 in the present embodiment, the present invention is not limited thereto. Specifically, a variation ratio in the positive electrode plate 31 can be set as in the present embodiment (expression (1)). Since the positive electrode plate 31 is formed by applying the constituent material of the positive electrode active material layer 31b onto the collector plate 31a, the variations in the width of the positive electrode active material layer 31b can be adjusted with the same method as in the present embodiment. In other words, it is only required that the variation ratio (ΔW/Wn) should satisfy the condition of the expression (1) in at least one of the positive electrode plate 31 and the negative electrode plate 32.

Of the separator 33, the positive electrode active material layer 31b, and the negative electrode active material layer 32b, the separator 33 is most easily impregnated with the electrolytic solution. The positive electrode active material layer 31b is next easily impregnated with the electrolytic solution. The negative electrode active material layer 32b is least easily impregnated with the electrolytic solution. Thus, when the variation ratio (ΔW/Wn) of the negative electrode active material layer 32b is set to satisfy the condition of the expression (1), the impregnation of the electrolytic solution into the negative electrode active material layer 32b can be efficiently achieved.

It is contemplated that the time for the impregnation of the electrolytic solution is extended in order to impregnate the negative electrode active material layer 32b with the electrolytic solution. However, as the time for the impregnation of the electrolytic solution is longer, the collector plate 32a of the negative electrode plate 32 may be dissolved. Thus, the time for the impregnation of the electrolytic solution can be shortened by easily impregnating the negative electrode active material layer 32b with the electrolytic solution in the manner described in the present embodiment.

The invention claimed is:

1. An electric storage apparatus comprising:
a positive electrode plate having a positive electrode active material layer, the positive electrode active material layer containing an electrolytic solution and being formed in a predetermined width on a partial region of a positive electrode collector plate;
a negative electrode plate having a negative electrode active material layer, the negative electrode active material layer containing the electrolytic solution and being formed in a predetermined width on a partial region of a negative electrode collector plate; and
a separator placed between the positive electrode plate and the negative electrode plate and containing the electrolytic solution,
wherein
an edge of at least one active material layer, out of the positive electrode active material layer and the negative electrode active material, in a width direction has a waveform,
wherein a set value Wn of the width of the at least one active material layer and a variation ΔW of the width of the at least one active material layer satisfy a condition of the following expression (I):

$$0.03 \leq \Delta W/Wn \leq 0.056 \qquad (I),$$

and wherein the edge is located at a position in at least one of the positive electrode collector plate and the negative electrode collector plate that is adjacent to a region in which the at least one active material layer is not formed.

2. The electric storage apparatus according to claim 1, wherein the width of the negative electrode active material layer is larger than the width of the positive electrode active material layer, and
the negative active material layer satisfies the condition of the expression (I).

3. The electric storage apparatus according to claim 2, wherein a region of the negative electrode active material layer that is opposed to the positive electrode active material layer is not adjacent to the edge.

4. The electric storage apparatus according to claim 3, wherein the edge is located at a position in the negative electrode collector plate that is adjacent to a region in which the negative electrode active material layer is not formed.

* * * * *